United States Patent Office 3,652,612
Patented Mar. 28, 1972

3,652,612
PROCESS FOR THE PREPARATION OF DIANIONS AND OF α-SUBSTITUTED CARBOXYLIC ACIDS AND THEIR DECARBOXYLATED DERIVATIVES
Philip E. Pfeffer and Leonard S. Silbert, Philadelphia, Pa., assignors to the United States of America as represented by the Secretary of Agriculture
No Drawing. Filed Aug. 27, 1969, Ser. No. 853,505
Int. Cl. C08h 17/36
U.S. Cl. 260—413                                18 Claims

ABSTRACT OF THE DISCLOSURE

A process for the preparation of dianions of straight chain saturated and unsaturated aliphatic carboxylic acids and of α-substituted carboxylic acids and their decarboxylated derivatives. The carboxylic acid is metalated with lithium diisopropylamide in the mixed solvent system tetrahydrofuran - hexane - hexamethylphosphoramide and the metalated fatty acid is reacted in the same solvent system with an electrophile to produce the desired α-substituted carboxylic acid. Decarboxylation is also effected in the same solution thus making this method essentially a one step process for any of the products.

A non-exclusive, irrevocable, royalty-free license in the invention herein described, throughout the world for all purposes of the United States Government, with the power to grant sublicenses for such purposes, is hereby granted to the Government of the United States of America.

This invention relates to the preparation of metalated carboxylic acids and more specifically to an improved method of preparing dianions of straight chain saturated or unsaturated aliphatic carboxylic acids. In addition, this invention relates to the preparation of α-substituted carboxylic acids and their decarboxylated derivatives.

The preparation of α-sodio sodium acetate in good yields from sodamide was first shown by DePree and Closson (J.A.C.S. 80, 2311, 1958). However, their method could only be applied to acetic acid because the α-sodio sodium salts of any of the higher homologous acids decomposed.

The preparation of lithium α-lithio isobutyrate by reacting isobutyric acid with lithium diisopropylamide in tetrahydrofuran (THF)-hexane solution and reaction of the dianion with alkyl halides has been described by P. L. Creger (J.A.C.S. 89, 2500–2501, 1967). However, the present inventors found this procedure unsatisfactory in the preparation of dianions from straight chain acids and in the subsequent alkylation of the dianions. Typically, the reaction mixtures of dianions were cloudy and heterogeneous and yields of the alkylated products were not good. For example, in the preparation of the α-butyl derivatives of heptanoic, pelargonic, myristic and stearic acids, the yields were less than 45%. Thus, a process for preparing dianions and their alkylated derivatives in high yield from long straight chain acids is highly desirable.

It is therefore an object of this invention to provide an improved method of preparing dianions of long straight chain aliphatic carboxylic acids.

Another object of this invention is to provide an improved method of preparing the α-alkyl derivatives of straight chain aliphatic carboxylic acids.

Still another object of this nivention is to provide an improved method of preparing the decarboxylated derivatives of α-substituted carboxylic acids.

According to this invention the above objects are accomplished by the addition of the very polar solvent hexamethylphosphoramide (HMPA) to THF as a cosolvent for the preparation of the dianion and as the reaction medium in the preparation of the α-substituted carboxylic acids and their decarboxylated derivatives.

Other basic polar solvents such as dimethylsulfoxide and N,N-dimethylformamide react with the dianion and regenerate acid, thus providing no product yield. Consequently, it was totally unexpected that HMPA, a strong basic polar solvent, would not metalate or compete for base as do the other basic solvents.

The superiority of the process of the present invention is demonstrated in the preparation of the α-butyl derivatives of heptanoic, pelargonic, myristic and stearic acids. Whereas the yields when the derivatives were prepared without the benefit of the improvement of the present invention were below 45%, the percent yields when prepared by the process of the present invention were 95, 95, 90 and 87, respectively. Yields of the α-butyl derivatives of oleic and undecylenic acids were greater than 90%. An important fact to note relevant to the α-butyl derivatives of the unsaturated acids is that no double bond migration occurred.

Addition of the very polar solvent HMPA not only solubilizes the dianion making the reaction homogeneous but it also has an accelerating effect on the reaction and drive it to near completion. This beneficial effect was surprising and totally unexpected in view of the fact that other basic polar solvents had a deterimental effect on the reaction.

In addition to being a superior method of converting carboxylic acids into their α-lithio lithium salts (dianions) and then to the α-alkyl derivatives, the process of the present invention is also a novel way of preparing alkyl nitro compounds, substituted malonic acids, α-hydroxy compounds, dithio-alkene-acetals and aldehydes.

A typical procedure for the preparation of the dianion is as follows: Into a dry, nitrogen flushed flask under a nitrogen atmosphere was added 35 ml. of anhydrous tetrahydrofuran (THF) and 4.9 g. (0.049 m.) of diisopropylamine. To the magnetically stirred solution of 30 ml. of 1.6 m. (0.048 m.) n-butyl lithium in hexane was added at such a rate as to maintain the reaction temperature below 0° C. n-Heptanoic acid (2.95 g.; 0.0227 m.) was then added to the cold basic solution and again the temperature was kept below 0° C. After stirring for an additional fifteen minutes, 9 ml. (0.050 m.) of hexamethylphosphoramide (HMPA) was added and the solution which had been milky white became transparent and light yellow.

Dianions of other straight chain saturated and unsaturated aliphatic carboxylic acids were made by substituting in the place of n-heptanoic acid a 0.227 molar amount of the appropriate acid.

At this point an electron deficient species may be added at once to the dianion at 0° C. to give the corresponding α-substituted carboxylates or decarboxylated products.

Preparation of some of the derivatives is exemplified by the following:

MALONIC ACID DERIVATIVES

The preparation of malonic acid derivatives directly from fatty acids was achieved in essentially quantitative yields. This reaction opens up a wide range of possibilities as a replacement to the expensive malonic acid. $CO_2$ gas was bubbled into the dianion solution and the solution was stirred for two hours. A near quantitative yield of substituted malonic acid was obtained

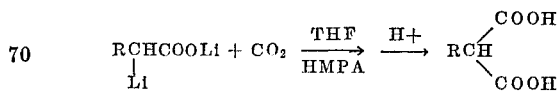

α-HYDROXY CARBOXYLIC ACIDS

α-Hydroxy carboxylic acids were prepared in yields greater than 80% by the treatment of the dianion with $O_2$.

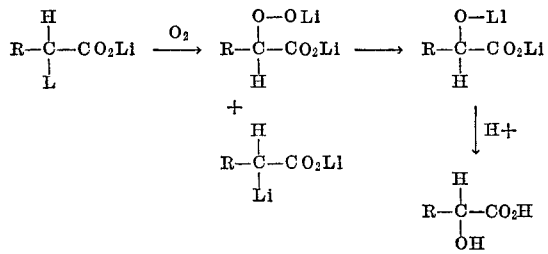

The malonic acid derivatives and the α-hydroxy acids were isolated as follows: At 0° C., 150 ml. of 10% HCl was added with good stirring. The aqueous layer was then separated and washed twice with 2–175 ml. portions of 30–60° C. petroleum ether. The combined organic layers were then washed 5 times with 75 ml. portions of dilute HCl, $H_2O$ and saturated NaCl solution. It was then dried over $Na_2SO_4$ and the solvent removed on a rotary film evaporator, to yield the product which may then be distilled or recrystallized as desired.

DITHIO-ALKENE-ACETALS

In order to prepare 1, 1-bis (methyl thio)-heptene-1 the dianion had to be prepared in the presence of an additional equivalent of base (used 0.98 m. of BuLi and 0.098 m. of diisopropyl amine). The dianion prepared in this manner was then reacted with $CS_2$ at 0° C. followed 1 hour later by 2 equivalents of methyl iodide.

The initial reaction of the dianion and $CS_2$ forms a sulfur analog to malonic acid. The reaction was not stopped at this stage nor was an attempt made to isolate the products. Instead the intermediate was reacted with alkyl halide. The sequence is as follows:

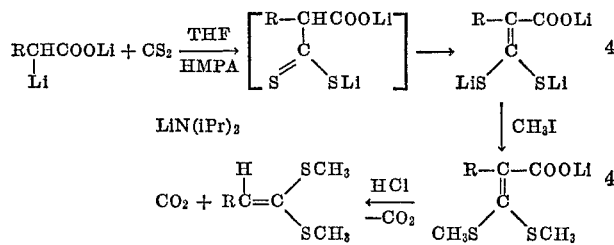

ALKYL NITRO COMPOUNDS

The nitro compounds were prepared by adding one equivalent of amyl nitrate to the dianion. Decarboxylation ensued upon acidification to give the 1-nitro-alkane.

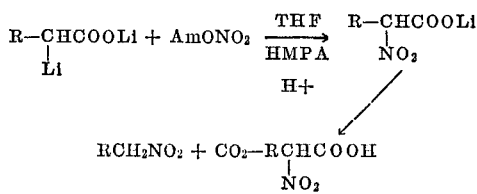

The dithio-alkene-acetals and the alkyl nitro compounds were isolated by the following procedure: At 0° C., 150 ml. of water was added with stirring. The organic layer was removed and 2-100 ml. portions of petroleum ether (30–60° C.) were shaken with the reaction mixtures and removed. The aqueous phase was then acidified at 0° C. with 150 ml. of 10% HCl and then extracted 3 times with 100 ml. of 30–60° C. petroleum ether. The petroleum ether extracts were then thoroughly washed with 5-75 ml. portions of 10% HCl, $H_2O$, and saturated NACl solution. The organic layer was dried and the solvent removed on a rotary film evaporator to yield the product which may be distilled or recrystallized.

2-BUTYLHEPTANOIC ACID

N-butyl bromide (3.3 g.; 0.024 m.) was added to the dianion at 0° C. and the solution stirred for 2 hrs. at room temperature. Dilute hydrochloric acid (10%) was added at 0° C. until the mixture became acidic. The aqueous layer was separated and extracted with petroleum ether (30–60° C.). The combined organic layers were washed five times with 100 ml. portions of dilute hydrochloric acid, $H_2O$, and saturated sodium chloride solutions. The organic layer was then dried over anhydrous sodium sulfate and the solvent removed on a rotary film evaporator. The residue was distilled through a 5 inch Vigreux column to give 4.06 g., 96% of a colorless oil boiling at 175–177° C. at 30 mm. Examination of this oil on a gas chromatographic column (¼", 6', 25% DEGA, phosphoric acid treated 60/80 chromosorb A) at 180° C. showed this product to be 96.5% 2-butylheptanoic acid and 3.5% n-heptanoic acid.

ALDEHYDES

The dianion having the appropriate straight chain saturated or unsaturated aliphatic alkyl radical was prepared as previously described. The dianion was transferred to an addition funnel and then slowly over a period of about an hour added to a solution of ethyl formate (0.049 mole) in 15 ml. of anhydrous THF while the reaction mixture was kept at about −5° to 0° C. The reaction mixture was stirred for about 1.5 hrs. and then heated at about 55° C. for 30 minutes to effect decarboxylation. Water was added to destroy any excess base and the reaction mixture was then extracted with pentane. The pentane extracts were combined and extracted with 10% HCl, 10% sodium carbonate solution, water and saturated sodium chloride solution. The pentane solution was dried and then the solvent was removed. Pure heptanal and pure nonanal were obtained in yields of greater than 70% by this process. Reaction of the dianion with ethyl formate and subsequent decarboxylation to obtain long chain aldehydes is shown in the following equation:

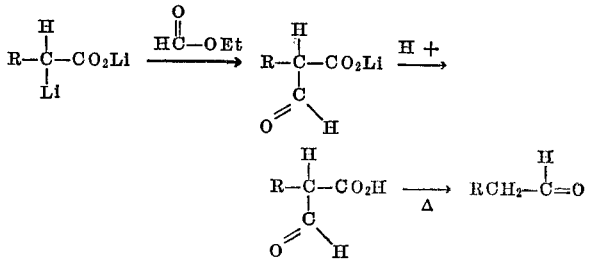

The α-substituted carboxylic acids and their decarboxylated derivatives prepared by the process of this invention are useful in many areas of commercial endeavor such as in the preparation of hypnotics, deodorants, fumigants, photography, polymers, rubber, tobacco flavorants, waterproofing, perfumes, food flavorings and as chelating agents.

We claim:

1. A process for the preparation of dianions of straight chain saturated and unsaturated aliphatic carboxylic acids comprising metalating the acid with lithium diisopropylamide in the mixed solvent system tetrahydrofuran-hexane-hexamethylphosphoramide.

2. A process as recited in claim 1 in which the carboxylic acid contains from 7 to 18 carbon atoms.

3. A process for the preparation of α-substituted carboxylic acids selected from the group consisting of malonic acid derivatives, α-hydroxy carboxylic acids, dithio-alkene-acetals, alkyl nitro compounds, 2-butylheptanoic acid, 2-butylpelargonic acid, 2-butylmyristic acid, 2-butylstearic acid, 2-butyloleic acid, and 2-butylundecylenic acid comprising the steps of:

(a) metalating a fatty acid selected from the group consisting of straight chain saturated and unsaturated aliphatic carboxylic acids; and (b) reacting said metalated fatty acid with an electrophile selected from the group consisting of carbon dioxide, oxygen, carbon disulphide, amyl nitrate, ethyl formate and n-butyl bromide, process being carried out in the medium of the mixed solvent system tetrahydrofuran-hexane-hexamethylphosphoramide.

4. A process as recited in claim 3 in which the carboxylic acid contains from 7 to 18 carbon atoms.

5. A process as recited in claim 4 in which the carboxylic acid is n-heptanoic acid.

6. A process as recited in claim 5 in which the electrophile is carbon dioxide.

7. A process as recited in claim 5 in which the electrophile is oxygen.

8. A process as recited in claim 5 in which the electrophile is carbon disulfide.

9. A process as recited in claim 5 in which the electrophile is amyl nitrate.

10. A process as recited in claim 5 in which the electrophile is ethyl formate.

11. A process as recited in claim 5 in which the electrophile is a primary alkyl halide.

12. A process as recited in claim 11 in which the primary alkyl halide is n-butyl bromide.

13. A process as recited in claim 4 in which the carboxylic acid is pelargonic acid.

14. A process as recited in claim 13 in which the electrophile is ethyl formate.

15. A process as recited in claim 4 in which the carboxylic acid is myristic acid.

16. A process as recited in claim 4 in which the carboxylic acid is stearic acid.

17. A process as recited in claim 4 in which the carboxylic acid is oleic acid.

18. A process as recited in claim 4 in which the carboxylic acid is undecylenic acid.

References Cited

UNITED STATES PATENTS

| | | | |
|---|---|---|---|
| 2,260,800 | 11/1941 | Bush | 260—537 |
| 2,909,565 | 10/1959 | DePree | 260—541 |
| 2,918,494 | 12/1959 | Closson et al. | 260—541 |

OTHER REFERENCES

Okhlobystin et al., C. A. 1965, vol. 62, 13169 c.
Normant et al. (I), C. A. 1965, vol. 63, 13134 h.
Normant et al. (II), C. A. 1965, vol. 63, 13135 h.
Normant et al. (III), C. A. 1966, vol. 64, 9759 b.
Creger, Journ. Amer. Chem. Soc., 89:10, May 10, 1967, p. 2500.

LEWIS GOTTS, Primary Examiner

E. G. LOVE, Assistant Examiner

U.S. Cl. X.R.

260—535, 537, 540, 601